(12) United States Patent
Allen

(10) Patent No.: US 6,516,826 B2
(45) Date of Patent: Feb. 11, 2003

(54) HYDRAULIC FLOW VALVE

(76) Inventor: Harold Allen, P.O. Box 23, Fawnskin, CA (US) 92333

( * ) Notice: Subject to any disclaimer, the term of this patent is extended or adjusted under 35 U.S.C. 154(b) by 31 days.

(21) Appl. No.: 09/893,794

(22) Filed: Jun. 27, 2001

(65) Prior Publication Data

US 2003/0000575 A1 Jan. 2, 2003

(51) Int. Cl.[7] .............................................. G05D 11/00
(52) U.S. Cl. .................. 137/118.04; 251/257; 251/263
(58) Field of Search ........................ 137/118.04, 118.05, 137/115.03, 115.12, 115.24; 251/257, 263; 73/861.76

(56) References Cited

U.S. PATENT DOCUMENTS

| | | | | |
|---|---|---|---|---|
| 127,009 | A | * 5/1872 | Allen | ..................... 137/115.12 |
| 297,087 | A | * 4/1884 | Prunty | ................... 137/115.12 |
| 2,076,600 | A | 4/1937 | Smith | |
| 2,197,473 | A | 4/1940 | Jackson et al. | |
| 3,284,788 | A | 11/1966 | Hudson | |
| 3,688,645 | A | 9/1972 | Reaves | |
| 4,197,809 | A | 4/1980 | Johnson | |
| 4,605,200 | A | * 8/1986 | Huppee | ...................... 137/523 |
| 4,991,655 | A | 2/1991 | McHugh | |
| 5,101,862 | A | 4/1992 | Leete | |
| 5,588,462 | A | 12/1996 | McHugh | |

FOREIGN PATENT DOCUMENTS

WO    WO99/56092    11/1999

* cited by examiner

Primary Examiner—Stephen M. Hepperle
(74) Attorney, Agent, or Firm—Gene Scott-Patent Law & Venture Group

(57) ABSTRACT

A hydraulic flow valve apparatus having a valve body providing a valve body cavity with an eccentric sidewall. The sidewall terminates at a frontal surface of the valve body with a conical bottom surface defining a flow aperture at its apex. A sealing shaft is fitted within the cavity and is enabled for lateral movement due to the eccentric sidewall. The sealing shaft provides at one end, a rubber seat sealing the flow aperture, and at the other end, a planar surface set at an off-normal angle. A fluid actuated vane extends away from the frontal surface of the valve body and is pivotally engaged with the planar surface of the sealing shaft so as to move the sealing shaft laterally, so as to uncover the aperture when the vane is forced out of a selected preliminary alignment with the sealing shaft.

4 Claims, 3 Drawing Sheets

HYDRAULIC FLOW VALVE

BACKGROUND OF THE INVENTION

1. Field of the Invention

This invention relates generally to flow valves and more particularly to a valve for use in a fire alarm system or fire sprinkler system.

2. Description of Related Art

The following art defines the present state of this field:

Smith, U.S. Pat. No. 2,076,600 describes a device of the class described comprising a body having a through flow passage, a pivotally mounted vane normally extending transversely of the line of flow through said passage, said vane being swingable under the force of fluid traversing said passage, there being an orifice communicating with said passage, a movable valve element controlling said orifice, cam means rocked as a result of swinging of said vane, and follower means engaging said cam means and connected to said valve element for controlling the latter in dependence upon the position of said vane.

Jackson et al., U.S. Pat. No. 2,197,473 describes a flow indicator in combination, a fluid conduit having an aperture therein, a housing providing a fluid chamber, a tubular fitting adapted to be secured to the side of the conduit adjacent said aperature for connecting said housing and conduit and providing communication between the housing chamber and interior of the conduit, said fitting provided with a valve seat thereon, a valve arranged to cooperate with said valve seat, and impeller arranged within the conduit connecting means between said impeller and valve for actuating the valve upon actuation of the said impeller by the fluid within the conduit, said housing provided with and outlet from said chamber, a manually operated valve for regulating the rate of flow through said outlet, a circuit controller arranged without said chamber, and means operative by fluid within the chamber for controlling said circuit breaker.

Hudson, U.S. Pat. No. 3,284,788 describes a system for monitoring the rate of flow of a substance, said system comprising first and second circuits, each of said first and second circuits comprising first and second clamp circuits and first and second timer circuits, respectively, a two-position switch having a movable contact, means to apply a source of voltage to said movable contact, means cooperatively engaged with said movable contact to actuate said switch from one of two positions to the other of said two positions at a frequency whose period is a function of the rate of flow of said substance, means connecting said first circuit to said switch to energize said first clamp circuit when said switch is in one of said two positions thereof, means connecting said second circuit to said switch to energize said second clamp circuit when said switch is in the other of said two positions thereof, means including a source of voltage to energize said first or said second timer circuit when said first or said second clamp circuit, respectively, is de-energized, said first and said second timer circuits comprising means to produce and output signal when energized for a predetermined period of time, and means connecting said first and said second timer circuits to said output means to apply said output signal thereto.

Reaves, U.S. Pat. No. 3,688,645 describes a valve control apparatus including a housing having a shaft member rotatably mounted therein. One end of the shaft member is connected to a valve stem of a valve to be controlled. The shaft member has a radially projecting vane fixed thereto which is rotatable through a predetermined arc within the housing. A unitary seal is provided to encircle the shaft member above and below the vane and to surround the periphery of the vane. A groove is formed in the periphery of the vane to support the seal. Fluid is selectively introduced into the housing to rotate the vane and shaft member in a desired direction. The unitary seal provides a continuous sealing surface which prevents fluid leakage from one side of the vane to the other and prevents fluid leakage from the inside to the outside of the housing along the shaft member.

Johnson, U.S. Pat. No. 4,197,809 describes a flow responsive device for use in a fluid flow system to establish a signal when a predetermined flow rate is attained within a flow conduit. The device is adapted for connection to a flow conduit and has a target vane adapted for insertion within the flow conduit for movement in response to predetermined flow to open internal valve means against the bias force of a compression spring and control pressure within a pressure chamber. In operation, the control pressure is maintained at a higher pressure than the fluid pressure within the flow conduit so that after initial opening of the valve means, the control pressure drops and the valve means undergoes fast-action movement to its fully open condition. The flow rate at which the valve means closes is less than the flow rate at which the valve means opens so that hunting of the valve means during operation is prevented. The pressure chamber may be connected to a control line having a flow restrictor therein so that when the valve means is opened, a pressure drop across the flow restrictor establishes a signal which may be employed to control external equipment.

McHugh, U.S. Pat. No. 4,991,655 describes an alarm valve and a backflow preventer providing a check valve and an alarm valve with a passageway provided between the check valve and the alarm valve preferably having a relief valve which selectively drains the passageway in response to the pressure in the main conduit upstream of the check valve. An alarm is sounded when the alarm valve is open. An impeller flow sensor may be provided in the backflow prevention device.

Leete, U.S. Pat. No. 5,101,862 describes an oscillatory rotary actuator providing for controlling an adjustable valve. The actuator comprises a freely rotating, cylindrical housing with concentric inner and outer walls about its center. The housing has at least one depending vane, which functions as a rotary piston, that is radially disposed between the inner and outer walls. The rotary actuator further comprises an annular chamber casing which has two concentric walls that are designed to mate between the inner and outer walls of the housing member to receive the depending vane(s) between the concentric walls of the chamber casing. At least one radially extending chamber wall is interposed and attached to the concentric walls of the chamber casing. When the housing member is fitted over or receives the annular chamber casing, the housing, chamber casing and chamber wall collectively form at least one rotary chamber for the arcuate movement of the depending vane, or rotary piston, therein. A valve control system is also provided for the operation of an adjustable valve for controlling the flow of fluid therethrough from a control module located at a distance from the valve. The valve can be operated as a function of a desired valve position utilizing actuator position feedback sensing; desired fluid pressure utilizing pressure feedback sensing; or desired fluid flow rate utilizing flow feedback sensing. The adjustable valve is preferably one that has a quarter turn from the open to the close position, such as a ball valve or butterfly valve.

McHugh, U.S. Pat. No. 5,588,462 describes a valve and sensor arrangement including a valve which has a valve member. A sensor such as a sensor for detecting a flow of water through the valve is provided within the valve member and is preferably perpendicular to a turning axis of the valve member. The sensor is preferably a flow sensor which is rotated by flow through the valve and the sensor arrangement may be provided in a valve of general utility.

Miller, WO99/56092 describes a flow sensor using induction pickup and having an improved paddle wheel type impeller within an impeller housing having a concave opening defining a protective skirt area for shielding a portion of the paddle wheel and a stem of the paddle wheel with a varying thickness for reducing cavitational backflow and therefore achieving a precise measurement of the fluid flow velocity and a high turndown ratio.

The prior art teaches the use of flow valves of various types, but does not teach the present use of a cam surface for selecting a relationship between a fluid energized paddle and an opening of a flow aperture.

SUMMARY OF THE INVENTION

The present invention teaches certain benefits in construction and use, which give rise to the objectives described below.

A hydraulic flow valve apparatus has a valve body providing a cavity with an eccentric sidewall. The sidewall terminates with a conical bottom surface defining a flow aperture at its apex. A sealing shaft is fitted within the cavity and is enabled for lateral movement due to the eccentric sidewall. The sealing shaft provides at one end, a rubber seat which normally seals the flow aperture, and at the other end, it provides a planar surface set at an off-normal angle. A fluid actuated vane extends away from the frontal surface of the valve body and is pivotally engaged with the planar surface of the sealing shaft so as to move the sealing shaft laterally, which action then uncovers the aperture when the vane is forced out of a selected preliminary alignment with the sealing shaft. A cam engaged with the vane is used to select a desired relationship between the motion of the vane and the motion of the sealing shaft. By selecting a particular cam shape, the vane's motion is transmitted to the sealing shaft in a transfer curve of one's choice. The cam may be replaced with an alternate cam to change the transfer function. The application of the present invention is for fire sprinkler systems. In such systems the vane is immersed in a water supply pipe that is normally filled. When a fire sprinkler ruptures, water flow starts in the water supply pipe and this moves the vane and uncovers the aperture. Water flows through the aperture and thereby provides a means for generating a fire alarm signal. False triggering of such alarms is of importance. Motion of the ground by natural or man-made causes, pressure testing of the fire control system, developed water leaks, and many other causes can result in false alarms. The present invention is a means for assuring that certain types and durations of motion of the vane can occur without triggering a false alarm, while assuring that an alarm will occur when significant and sustained water flow occurs.

A primary objective of the present invention is to provide an apparatus and method of use of such apparatus that provides advantages not taught by the prior art.

An important objective is to provide such an invention capable of opening a valve in accordance with a highly specific and selectable fluid flow characteristic.

A further objective is to provide such an invention capable of being easily adapted to alternate valve flow characteristics.

A general objective is to provide such an invention capable of simple adaptation to various systems where false water flow alarms are caused by significantly different circumstances.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention in at least one of its preferred embodiments, which is further defined in detail in the following description.

Figure 1:
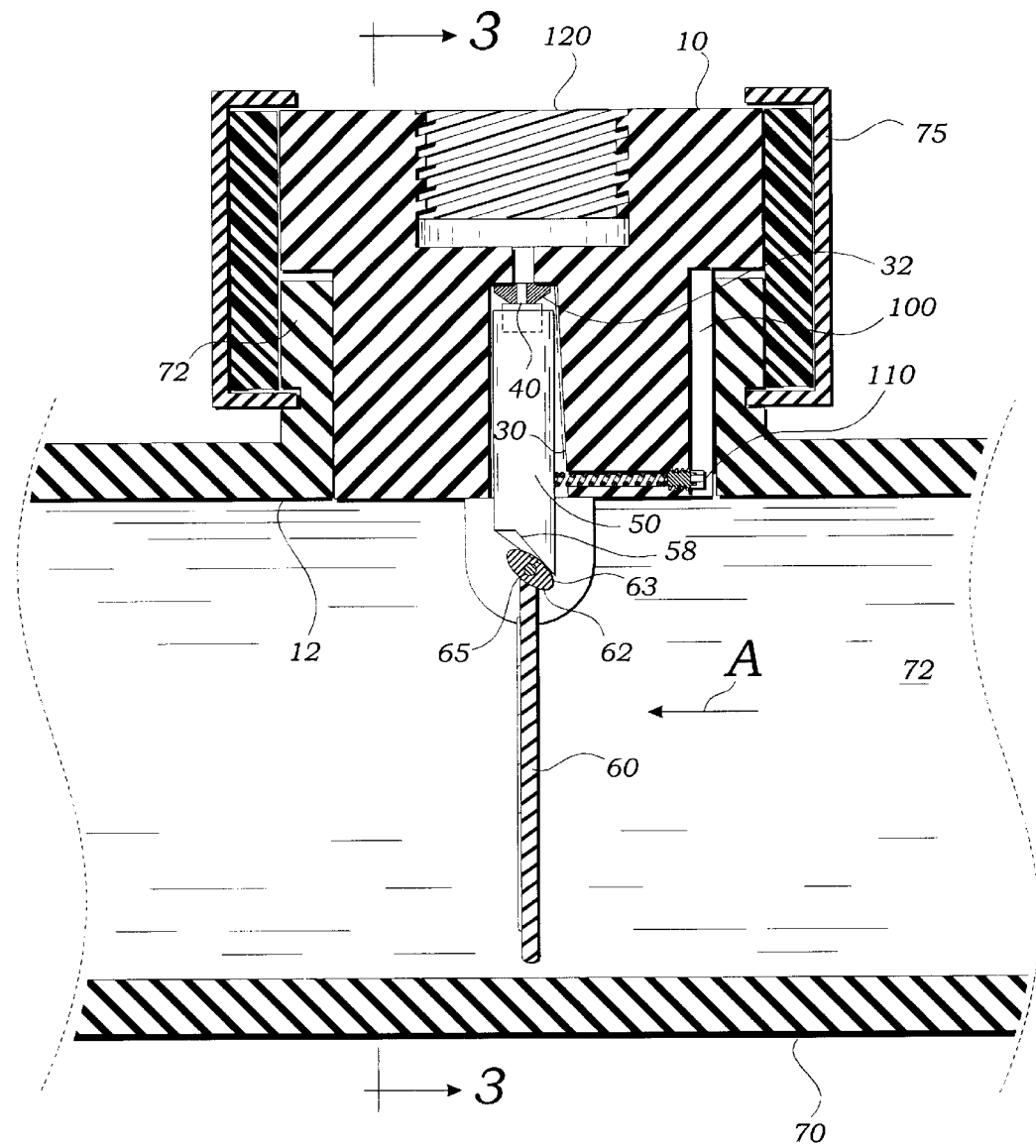
FIG. 1 is a section view of the preferred embodiment of the invention in a non-actuated state.

The present invention is a hydraulic flow valve apparatus comprising a valve body 10, preferably of brass or similar material, providing a valve body cavity 20 having an eccentric sidewall 30. The figures show this eccentricity, which results in a uniformly widening of the cavity 20 from one end to the other. The sidewall 30 terminates at a frontal surface 12 of the valve body 10. A conical bottom surface 32 of the cavity 20 defines a flow aperture 40 at an apex of surface 32. A sealing shaft 50 is fitted within the cavity 20 and is enabled by the fact that it is diametrically smaller then the cavity 20, for lateral movement within the cavity 20. Such movement is clearly illustrated when comparing the positions of the shaft 50 in FIGS. 1 and 2. The sealing shaft 50, preferably made of a non-corrosive metal or plastic, has fixed at one end 52, a rubber seat 54 positioned and placed for sealingly covering the flow aperture 40. The other end 56, is formed as a planar surface 58 set at an off-normal angle, as clearly shown in the figures. A fluid actuated vane 60 is positioned for extending away from the frontal surface 12 of the valve body 10 and is pivotally engaged with the planar surface 58 of the sealing shaft 50 so as to be able to move the sealing shaft 50 laterally against bias spring 80. Motion of the vane 60, as is demonstrated in the figures, tends to uncover the flow aperture 40 when the vane 60 is forced, by water flow, out of a selected nominal alignment (shown in FIG. 1) with the sealing shaft 50.

The preferred application of the above-described apparatus is in a conduit 70, such as a water pipe. The conduit 70 provides a conduit side wall 72. The valve body 10 is engaged within the conduit sidewall 72 so as to position the vane 60 across the interior breath of the conduit 70 in a position clearly enabled for detecting fluid motion within the conduit 70. The vane 60 is adapted for moving away from the selected nominal alignment with the sealing shaft 50 when such fluid motion occurs. See arrow "A" in FIG. 2. The engagement of the valve body 10 with the conduit 70 may take any one of several well-known approaches. As shown in the figures, the valve body may be a slip fit into a tee 72 fixed to the conduit 70 by welding or by clamped force and o'ring seal (not shown). The interior of the tee 72 may be threaded or smooth. When the tee 72 is smooth, as shown in the figures, the valve body 10 may be held in place on the tee 72 by fittings 75 as shown. Such fittings 75 are well known commercial products and provide clamping force and rubber seals, as shown. Other types of hardware fixtures and attachments may be used and will be known by those of skill in the art. Bias spring 80 is held in place by a threaded cap 110. This cap extends from the valve body as shown. A keyway 100 is fashioned in the tee 72 so that the cap 110 establishes orientation of the vane 60 when the valve body 10 is inserted into tee 72 and the cap 110 enters keyway 100. When the valve body 10 receives a further fitting within female threads 120, the cap 110 acts to prevent rotation of the valve body 10.

Figure 2:
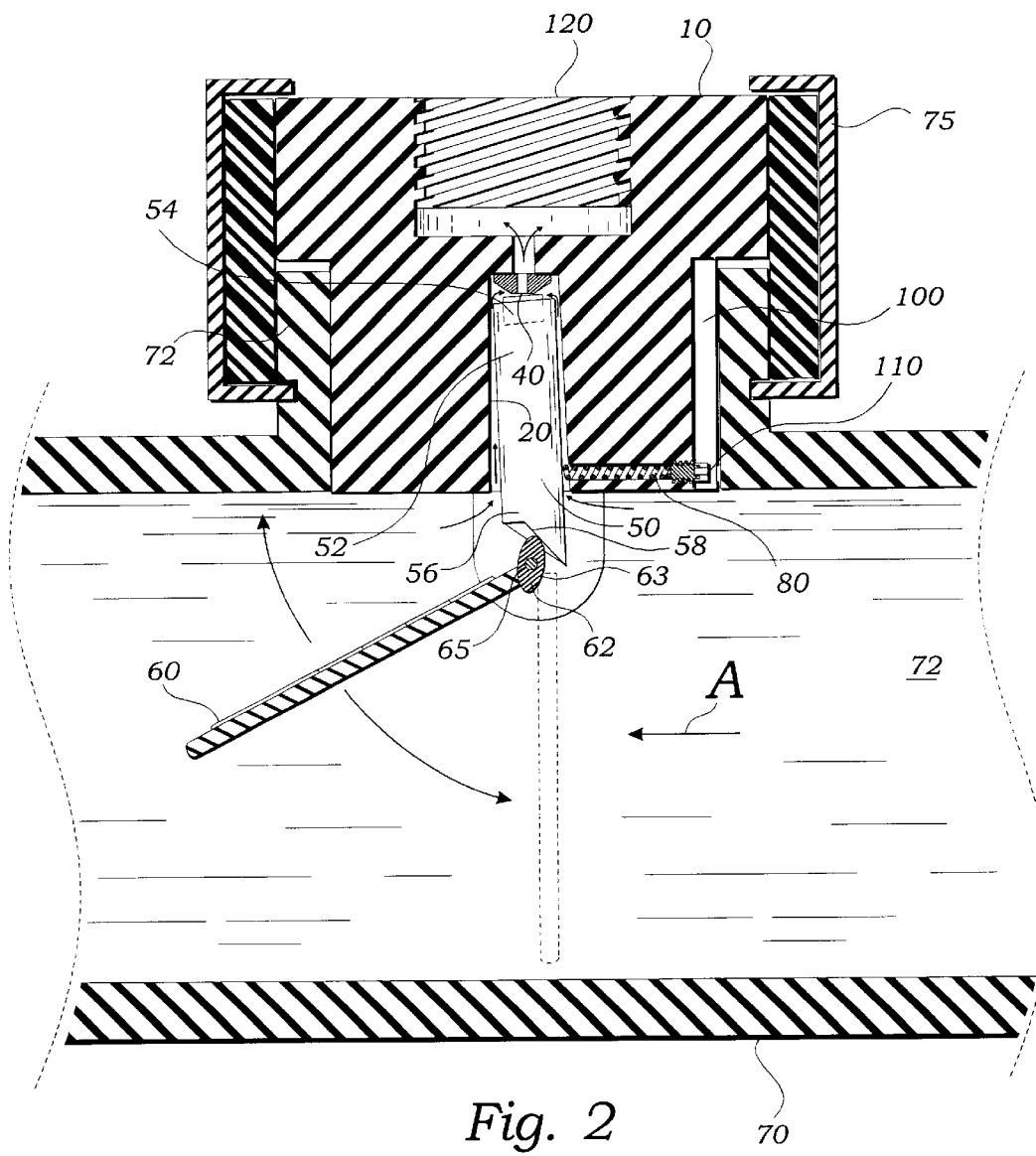
FIG. 2 is a similar view thereof but in an actuated state.
Figure 3:
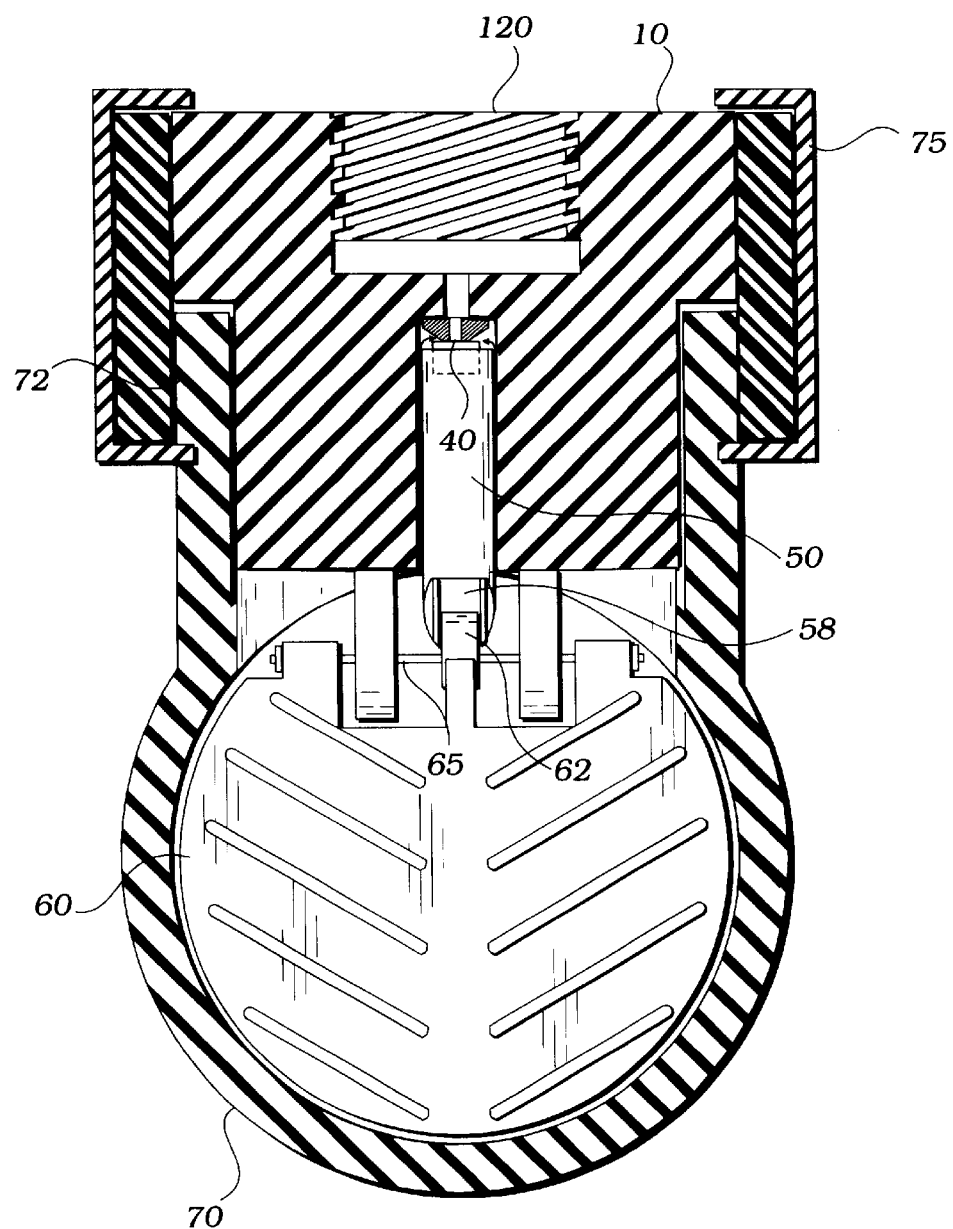
FIG. 3 is a section view thereof taken at line 3—3 in FIG. 1.

The vane preferably provides a cam 62 fixed to move with the vane and positioned in contact with the planar surface 58 of the sealing shaft 50, the cam 62 providing a cam surface 63 adapted for establishing a selected relationship between vane and sealing shaft motions. For instance, it is readily seen in FIG. 1, that when fluid flows in conduit 70, the initial motion of vane 60 and cam 62 causes relatively little lateral motion of sealing shaft 50 since the cam surface 63 contacts planar surface 58 with its long and slowly changing curved portion. However, as the vane 60 moves further, as shown in FIG. 2, incremental angular changes of the vane 60 and cam 62, cause ever greater incremental angular changes in the position of the shaft 50, until the aperture 40 is uncovered enough to allow water to flow through it. It should be seen that water flows from the conduit 70 to the aperture 40 by moving through the valve body cavity 20 in the spaces around the sealing shaft 50. Preferably, the cam 62 is fixed to the vane 60 by a removable engagement means 65, preferably a hinge pin, as shown in FIG. 3, thereby enabling one cam to be replaced by an alternately shaped cam quickly and easily.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A hydraulic flow valve apparatus comprising: a valve body providing a valve body cavity having an eccentric sidewall, the sidewall terminating at a frontal surface of the valve body; a conical bottom surface of the cavity defining a flow aperture at an apex thereof; a sealing shaft, fitted within the cavity and enabled for lateral movement therein, the sealing shaft providing at one end thereof, a rubber seat sealingly covering the flow aperture, and at the other end thereof, a planar surface set at an off-normal angle; a fluid actuated vane extending away from the frontal surface of the valve body and pivotally engaged with the planar surface of the sealing shaft so as to move the sealing shaft laterally, thereby uncovering the aperture when the vane is forced out of a selected preliminary alignment with the sealing shaft.

2. The apparatus of claim 1 further comprising a conduit providing a conduit side wall thereof, the valve body engaged within the conduit side wall so as to position the vane across an interior space of the conduit in a position for detecting fluid motion within the conduit, the vane adapted for moving away from the selected preliminary alignment with the sealing shaft when such fluid motion occurs.

3. The apparatus of claim 1 wherein the vane provides a cam in contact with the planar surface of the sealing shaft, the cam providing a cam surface adapted for establishing a selected relationship between vane and sealing shaft motions.

4. The apparatus of claim 1 wherein the cam is fixed to the vane by a removable engagement means.

* * * * *